Nov. 8, 1932.  B. MARKHAM  1,886,964

FOUR-WHEEL ATTACHMENT FOR TRUCKS

Filed March 17, 1930  2 Sheets-Sheet 1

INVENTOR.
BYRON MARKHAM
BY
ATTORNEYS.

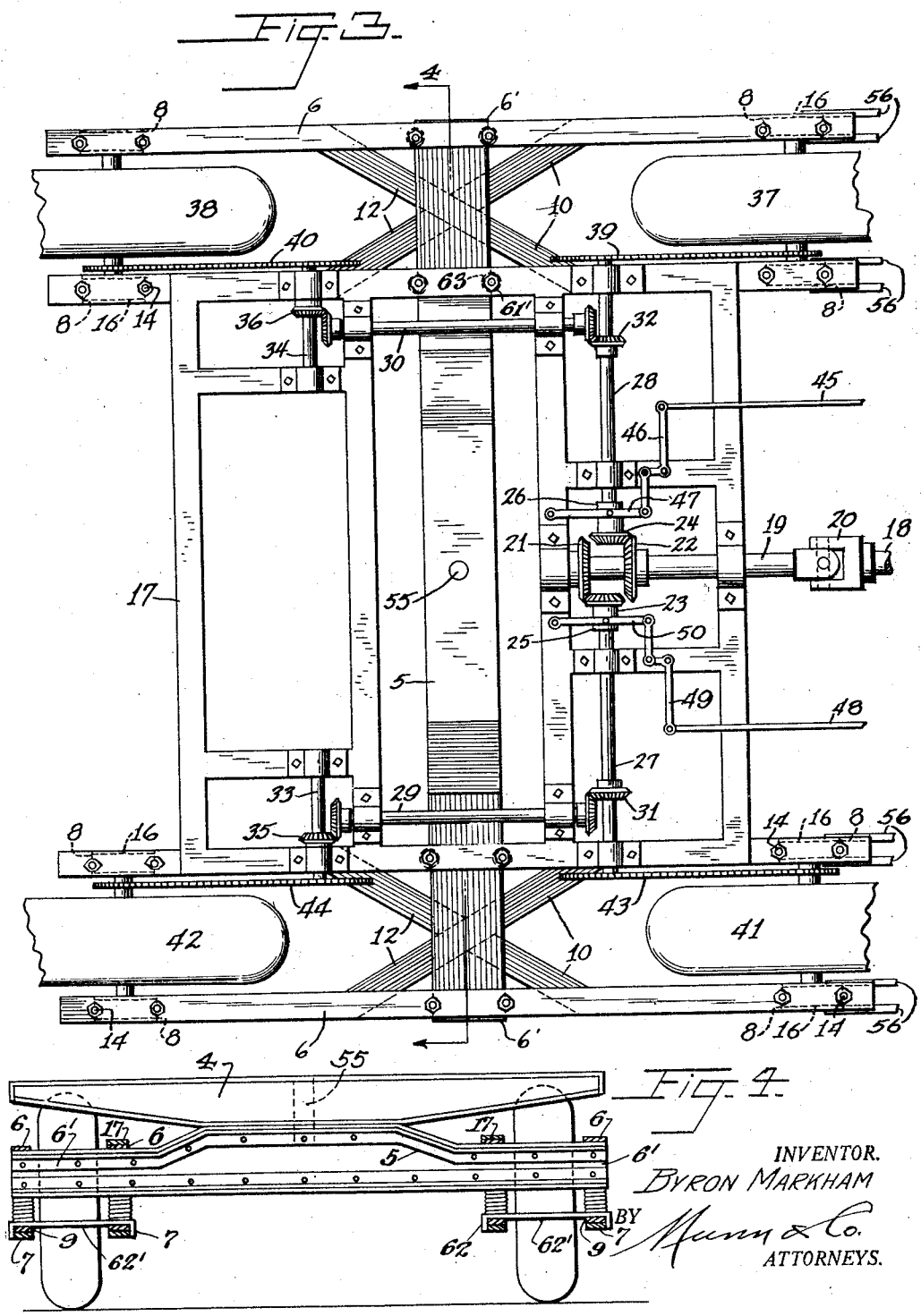

Patented Nov. 8, 1932

1,886,964

UNITED STATES PATENT OFFICE

BYRON MARKHAM, OF MARTINEZ, CALIFORNIA

FOUR WHEEL ATTACHMENT FOR TRUCKS

Application filed March 17, 1930. Serial No. 436,573.

My invention relates to improvements in four wheel attachments for trucks, and it consists in the combinations, constructions and arrangements hereinafter described and claimed.

An object of my invention is to provide a four wheel attachment which may be secured to a standard truck and take the place of the two rear wheels. The device requires no alteration in the truck body when securing the device in place.

A further object of my invention is to provide a device of the type described which has a novel gear mechanism which does away with the usual differential. The operator by shifting certain levers can cause all of the power to be applied to the two rear wheels on one side of the truck or to the two rear wheels on the other side of the truck, depending upon the direction in which the truck is turning. On a straightaway all four wheels may be positively connected to the propeller shaft.

A further object of my invention is to provide a device of the type described in which the four wheel attachment is pivotally secured to the truck body and is operatively connected to the steering mechanism so that the attachment will turn in the opposite direction to that taken by the front wheels. In this way a shorter turn can be made.

Other objects and advantages will appear as the specification proceeds, and the novel features of the device will be particularly pointed out in the claims hereto annexed.

My invention is illustrated in the accompanying drawings, in which:

Figure 3 is a top plan view of the attachment, and Figure 4 is a vertical section taken along line 4—4 of Figure 3.

Figure 1:
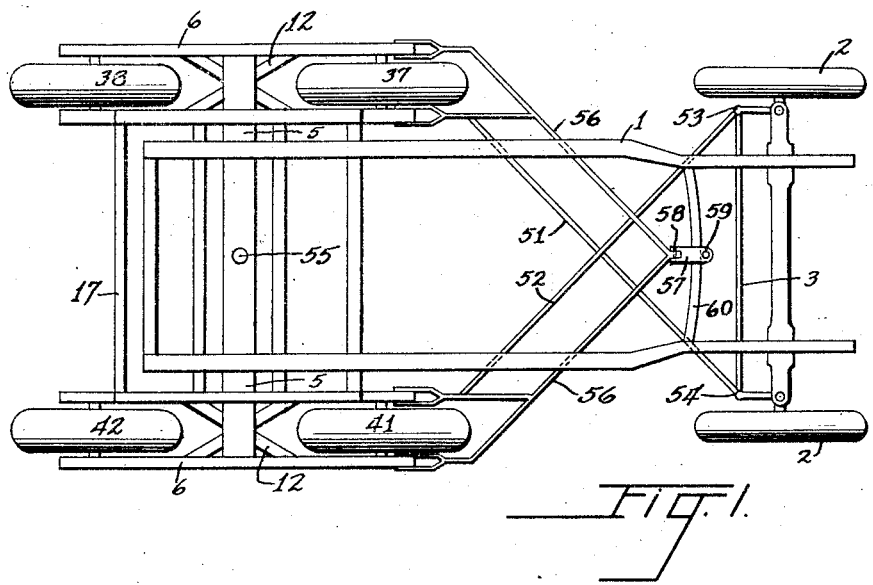
Figure 1 is a top plan view of the device shown operatively applied to a truck.

In carrying out my invention I make use of a truck chassis 1 having front wheels 2 and a steering mechanism indicated generally at 3. At the rear of the truck I mount a bolster 4, and I pivotally secure to this bolster a beam 5 of the shape shown in Figures 3 and 4. The bolster is removed in Figures 1 and 3.

It will be noted from Figure 3 that the beam 5 has reduced ends 6' that are carried by end members of the attachment. The attachment has a frame comprising end members 6 and 7, the members 6 being disposed above the members 7 (see Figure 2). There are two sets of members 6 and 7 for each side of the attachment. The members are spaced from each other by bearing blocks 8, and other members 9 and 10 act as braces in the manner shown in Figures 2 and 3. Each member 9, for example, extends from the tops of the blocks 8 and have mid-portions 11 contacting with the centers of the members 7. The members 10 are disposed beneath the members 7 and have their mid-portions bent so as to form a cross 12 (see Figure 3).

The bearing blocks 8 have semi-cylindrical grooves 13 in their vertical edges (see Figure 2) for receiving one-half of tie bolts 14. The bolts 14 not only secure the members 6, 9, 7 and 10 together, but they also hold the blocks 8 in place. The blocks 8 act as spacers between the members 6 and 9 and the members 7 and 10. It will further be noted that the blocks have portions 15 on their tops and bottoms for being received in recesses 16 in the members 9 and 7.

The inner members 6 carry a super-structure indicated generally at 17. This super-structure in turn supports the gearing mechanism now to be described.

A propeller shaft 18 shown in Figure 3 is connected to a stub shaft 19 by a universal joint 20. Bevel gears 21 and 22 are mounted on the shaft 19 and normally mesh with bevel gears 23 and 24 respectively. The gears 23 and 24 are carried by collars 25 and 26 which in turn are feathered to shafts 27 and 28 so that the gears may be moved longitudinally on the shafts, but when rotated they will rotate the shafts.

The shafts 27 and 28 are connected to intermediate shafts 29 and 30 by bevel gear sets 31 and 32, and the intermediate shafts are in turn connected to stub shafts 33 and 34 by bevel gear sets 35 and 36.

The shafts 28 and 34 are operatively connected to wheels 37 and 38 by chain and sprocket mechanisms 39 and 40 respectively.

In like manner the shafts 27 and 33 are connected to wheels 41 and 42 by chain and sprocket mechanisms 43 and 44 respectively. It will be seen from this construction that a rotation of the shaft 19 will cause all of the wheels 37, 38, 41 and 42 to rotate in the same direction and all to be positively connected to the shaft 19. If the driver wishes to disconnect the wheels 37 and 38, he pulls upon a rod 45 which in turn rocks a bell crank lever 46 and causes an arm 47 to move the gear 24 out of mesh with the gear 22. If it is desired to release the wheels 41 and 42, a similar pull upon a second rod 48 will rock a bell crank lever 49 and this will swing an arm 50 into a released position, the arm in turn causing the gear 23 to free the gear 21. The rods 45 and 48 are actuated when making right and left hand turns.

Figure 2:
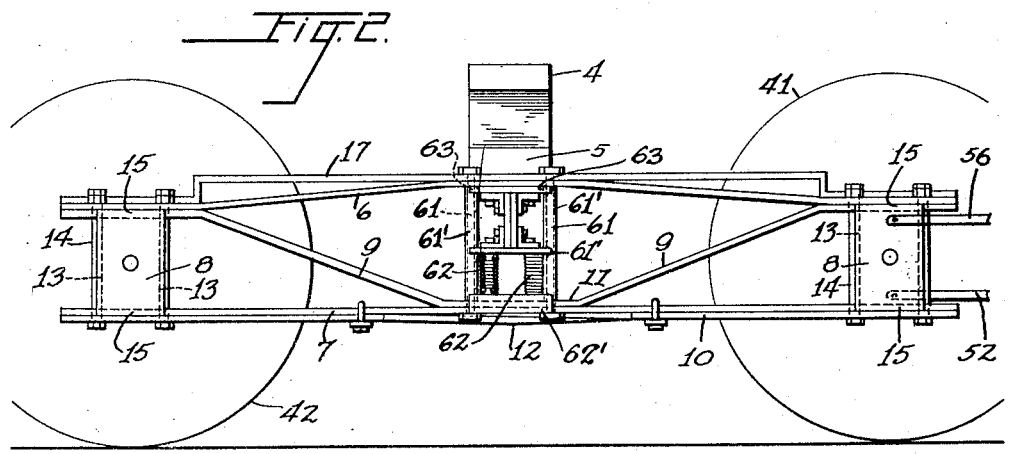
Figure 2 is a side elevation of the attachment.

Referring to Figure 1, it will be noted that the attachment is connected to the steering mechanism 3 by rods 51 and 52. These rods are pivotally connected to the steering mechanism at 53 and 54 and to the inner front bearing blocks 8 as shown in Figure 2. A turning of the front wheels to the right or to the left will actuate the rods 51 and 52 for turning the attachment in the opposite direction, the attachment pivoting about a king pin 55. I also provide a V-shaped brace 56 that is pivoted to a member 57 at 58, the member in turn carrying a roller 59 that is designed to roll along an arcuate guide member 60. The free ends of the V-shaped member 56 are forked, and they are connected to all four of the front bearing blocks 8 (see Figure 2).

It will be noted from Figure 2 that the beam 5 is slidably mounted between bolts 61 for vertical movement and is yieldingly supported by springs 62. The lower ends of the springs are supported on transversely-extending members 62′ in the manner shown in Figure 4. The bolts 61 have sleeve 61′. The beam 5 has recesses 63 for slidably receiving the sleeves 61′, yet these recesses, coacting with the sleeves, prevent longitudinal movement of the beam 5 with respect to the attachment.

Although I have shown and described one embodiment of my invention, it is to be understood that the same is susceptible of various changes, and I reserve the right to employ such changes as may come within the scope of the invention as claimed.

I claim:

1. A four-wheel attachment comprising a frame having supporting wheels, a beam extending transversely across the frame and having recesses therein, bolts carried by the frame and being received in the recesses, sleeves encircling the bolts and disposed in the recesses for allowing vertical movement of the beam, and springs disposed between the frame and the beam for yieldingly supporting the latter.

2. In a four wheel attachment, a frame having a guide for a beam, said guide comprising vertically disposed bolts carried by the frame, sleeves carried by the bolts, and a beam having recesses for slidably receiving the sleeves, said beam being movable vertically between the sleeves, the walls of the recesses bearing against the sleeves and preventing transverse movement with respect to the frame.

3. In a four wheel attachment, a frame having a guide for a beam, said guide comprising vertically disposed bolts carried by the frame, sleeves carried by the bolts, and a beam having recesses for slidably receiving the sleeves, said beam being movable vertically between the sleeves, the walls of the recesses bearing against the sleeves and preventing transverse movement with respect to the frame, and springs disposed between said beam and said frame for yieldingly supporting the beam.

BYRON MARKHAM.